(12) United States Patent
Savic et al.

(10) Patent No.: US 10,454,369 B2
(45) Date of Patent: Oct. 22, 2019

(54) SWITCHED CONVERTER CONTROL USING ADAPTIVE LOAD CURRENT SENSING AND FEEDFORWARD TECHNIQUE

(71) Applicant: Texas Instruments Incorporated, Dallas, TX (US)

(72) Inventors: Filip Savic, Freising (DE); Giacomo Calabrese, Freising (DE); Giovanni Frattini, Travaco' Siccomario (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/591,107

(22) Filed: May 10, 2017

(65) Prior Publication Data

US 2018/0152099 A1    May 31, 2018

Related U.S. Application Data

(60) Provisional application No. 62/426,677, filed on Nov. 28, 2016.

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01); *H02M 2001/0019* (2013.01)

(58) Field of Classification Search
CPC . H02M 2001/0009; H02M 2001/0016; H02M 2001/0019; H02M 2001/0025;
(Continued)

(56) References Cited

U.S. PATENT DOCUMENTS

| 2006/0043942 A1* | 3/2006 | Cohen | H02M 3/156 |
| | | | 323/207 |
| 2009/0027025 A1* | 1/2009 | Latham | H02M 3/157 |
| | | | 323/283 |

(Continued)

OTHER PUBLICATIONS

K. Choi, H. j. Kim and B. H. Cho, "Load current-sensor-less feed-forward method for fast load transient response using digital control," 2013 Twenty-Eighth Annual IEEE Applied Power Electronics Conference and Exposition (APEC), Long Beach, CA, USA, 2013, pp. 2769-2772.*

(Continued)

*Primary Examiner* — Yusef A Ahmed
*Assistant Examiner* — Jye-June Lee
(74) *Attorney, Agent, or Firm* — Michael A. Davis, Jr.; Charles A. Brill; Frank D. Cimino

(57) ABSTRACT

A switched voltage converter may be controlled with load current feedforward control loop in addition to an output voltage feedback loop. The converter includes a first switch device that is controlled to open and close at a selected switching rate with a selected duty cycle. The first switch device is coupled in series with an inductor and conducts current through the inductor while the first switch is closed. A second switch device conducts current from the inductor to an output capacitor and to load while the first switch is open to produce an output voltage and a resulting load current through the load. The load current is measured in a continuous manner and a load current feedforward control signal is generated that is representative of the load current. The switch rate and/or duty cycle of the first switch is adjusted in response to the load current feedforward control signal.

14 Claims, 7 Drawing Sheets

(58) Field of Classification Search
CPC ............ H02M 1/08; H02M 1/14; H02M 3/04; H02M 3/156
See application file for complete search history.

(56) References Cited

U.S. PATENT DOCUMENTS

| | | | | |
|---|---|---|---|---|
| 2009/0267580 | A1* | 10/2009 | Derksen | H02M 3/157 323/282 |
| 2010/0301825 | A1* | 12/2010 | Yamaguchi | H02M 3/1588 323/284 |
| 2013/0148396 | A1* | 6/2013 | Walters | H02M 1/4225 363/126 |
| 2014/0125306 | A1* | 5/2014 | Babazadeh | H02M 3/156 323/285 |
| 2014/0197813 | A1* | 7/2014 | Umetani | H02M 3/156 323/282 |
| 2014/0292293 | A1* | 10/2014 | Feckl | H02M 3/156 323/282 |
| 2014/0292300 | A1* | 10/2014 | Yan | H02M 3/157 323/288 |
| 2017/0098999 | A1* | 4/2017 | Calhoun | H02M 3/156 |

OTHER PUBLICATIONS

"The Right-Half-Plane Zero—A Simplified Explanation", Texas Instruments, Inc., 2001, pp. 1-5.

Onish Kumar, et al, "Augmented Boost Converter for Near Null-Load Transient Response", 2011 IEEEE Power and Energy Conference at Illinois (PECI), Feb. 25-26, 2011, Champaign, IL, pp. 1-6.

Santu Bag, et al, "Boost Converter Control using Smith Predictor Technique to minimize the effect of Right Half Plane Zero", 2013 IEEE International Conference on Control Applications (CCA), Part of 2013 IEEE Multi-Conference on Systems and Control, Aug. 2I8-30, 2013, Hyderbad, India, pp. 983-988.

Jie-Yu Liao, Han-Hsiang Huang, and Ke-Horng Chen, "Minimized Right-Half Plane Zero Effect on Fast Boost DC-DC Converter Achieved by Adaptive Voltage Positioning Technique", Proceedings of 2010 IEEE International Symposium on Circuits and Systems (ISCAS), May 30-Jun. 2, 2010, Paris, France, pp. 2916-2919.

Richard Redl and Nathan O. Sokal, "Near-Optimum Dynamic Regulation of DC-DC Converters Using Feed-Forward of Output Current and Input Voltage with Current-Mode Control", IEEE Transactions on Power Electronics, vol. PE-1, No. 3, Jul. 1986, pp. 181-192.

Kanakasabai Viswanathan, Ramesh Oruganti, and Dipti Srinivasan, "A Novel Tri-State Boost Converter With Fast Dynamics", IEEE Transactions on Power Electronics, vol. 17, No. 5, Sep. 2002, pp. 677-683.

"Understanding Poles and Zeros", Massachusetts Institute of Technology Department of Mechanical Engineering, 2.14 Analysis and Design of Feedback Control Systems, Dec. 30, 2016, pp. 1-13.

"TPS61089x 12.6-V, 7-A Fully-Integrated Synchronous Boost Converters in 2.0-mm × 2.5-mm VQFN Package", TPS61089,TPS610891, Texas Instruments, Inc., SLVSD38B, Nov. 2015, Revised Jul. 2016, pp. 1-29.

* cited by examiner

SWITCHED CONVERTER CONTROL USING ADAPTIVE LOAD CURRENT SENSING AND FEEDFORWARD TECHNIQUE

CLAIM OF PRIORITY UNDER 35 U.S.C. 119 (E) PROVISIONAL

The present application claims priority to and incorporates by reference U.S. Provisional Application No. 62/426,677, filed Nov. 28, 2016, entitled "Novel Control Approach for Boost Converter Using Adaptive Load Current Sensing and Feedforward Technique."

FIELD OF THE DISCLOSURE

This disclosure relates to switched mode voltage converters for DC to DC power conversion, and in particular to an adaptive load current sensing and feedforward control technique.

BACKGROUND OF THE DISCLOSURE

A boost converter, also referred to as a step-up converter, is a DC-to-DC (direct current) power converter that steps up voltage from its input supply to its output load. Coincidently, current flow is stepped down. A boost converter is a switched-mode power supply (SMPS) that typically includes at least a transistor that acts as a switch, a diode, and at least one energy storage element, such as a capacitor or inductor, or the two in combination. To reduce voltage ripple, filters are normally added to a boost converter's output and input. The input and output filters typically include capacitors, and may also include inductors.

SUMMARY

A switched voltage converter may be controlled with load current feedforward control loop in addition to an output voltage feedback loop. The converter includes a first switch device that is controlled to open and close at a selected switching rate with a selected duty cycle. The first switch device is coupled in series with an inductor and conducts current through the inductor while the first switch is closed. A second switch device conducts current from the inductor to an output capacitor and to load while the first switch is open to produce an output voltage and a resulting load current through the load. The load current is measured in a continuous manner and a load current feedforward control signal is generated that is representative of the load current. The switch rate and/or duty cycle of the first switch is adjusted in response to the load current feedforward control signal in order to quickly respond to changes in the load current.

BRIEF DESCRIPTION OF THE DRAWINGS

Particular embodiments in accordance with the disclosure will now be described, by way of example only, and with reference to the accompanying drawings.

Figure 1:
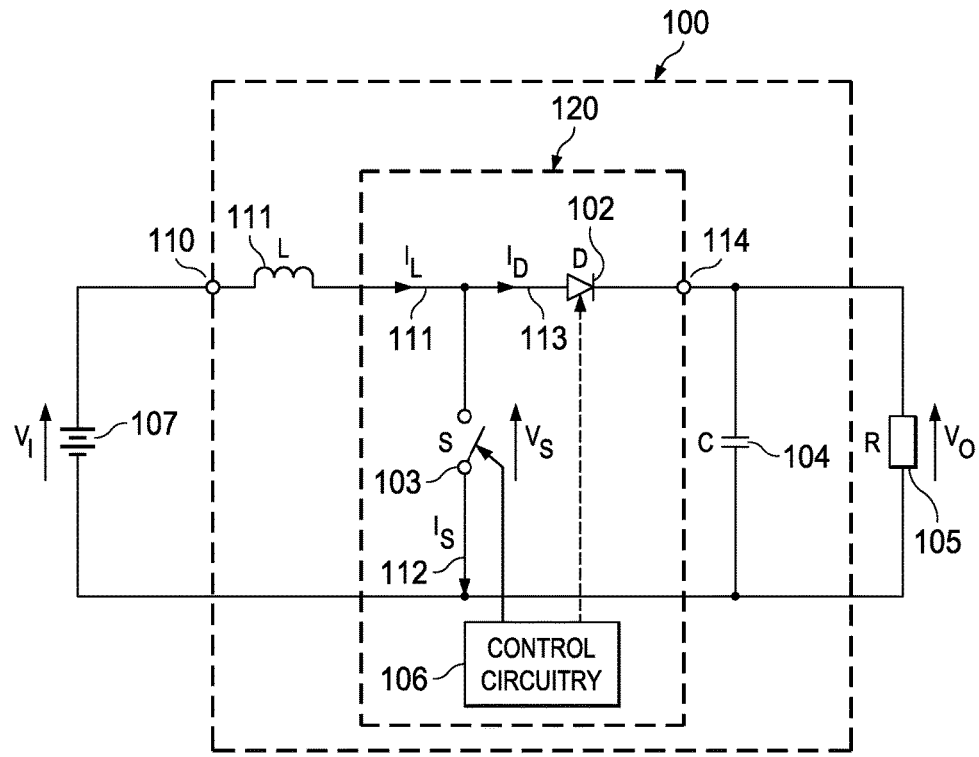
FIG. 1 is a simplified schematic of an example boost converter.

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Control theory uses the concept of "poles" and "zeros" in transfer functions that may be used to determine system response characteristics without solving a set of differential equations. In small signal loop analysis, poles and zeros are normally located in the left half of the complex s-plane. The Bode plot of a conventional or left half-plane zero may have a gain magnitude rising at 20 dB/decade above the zero frequency with an associated phase lead of 90°. This is the exact opposite of a conventional pole, whose gain magnitude decreases with frequency and the phase lags by 90°. Zeros are often introduced in loop compensation networks to cancel an existing pole at the same frequency; likewise poles are introduced to cancel existing zeros in order to maintain total phase lag around the loop less than 180° with adequate phase margin.

A right-half-plane (RHP) zero has the same 20 dB/decade rising gain magnitude as a conventional zero, but with 90° phase lag instead of lead. This characteristic is difficult if not impossible to compensate. The designer is usually forced to roll off the loop gain at a relatively low frequency. The crossover frequency may be a decade or more below what it otherwise could be, resulting in severe impairment of dynamic response.

The RHP zero (RHPZ) typically does not occur in circuits of the buck converter family. However, it may be encountered in flyback, boost and Ćuk (buck-boost converter) circuits, for example, when these circuits are operated in the continuous inductor current mode. Existence of the RHPZ constrains achievable closed-loop bandwidth, leading to a prolonged load-transient response.

In an embodiment of the present disclosure, the constraints of a RHPZ in a switched converter such as a flyback, boost, Ćuk, etc, may be mitigated by sensing the load current of the converter and using the result as a feedforward control signal. The level of this feedforward control signal may be adjusted by adaptation circuitry to an optimal level using an automatic gain control loop and a variable gain amplifier (VGA). This feedforward control signal may be combined with a classical peak current mode control architecture in some embodiments. Thus, by using a control system that does not need a strong bandwidth limitation for stability purposes, it is possible to achieve a faster response to transients an thereby mitigate the RHPZ presence.

Differentiation of a switched converter's output voltage provides a simple method for estimating the load current of boost converter. As will be explained in more detail below, this provides a "lossless" load current estimation.

The use of adaptation circuitry to set the level of the feedforward signal makes this solution flexible to variations of a converter's circuit elements, such as output capacitance, or to variation in voltage conversion ratio, etc. This provides flexibility to adjust the level of the estimated load current to an optimal theoretical value independently of the load current sensor that is used.

An embodiment of a boost converter will now be disclosed in more detail; however, the concepts disclosed herein may be generally extended to other types of discontinuous, pulsated, switched, etc. voltage converters. For example, inverting buck-boost, non-inverting buck-boost, flyback, Ćuk, etc. converters may be implemented using the techniques disclosed herein.

FIG. 1 is a simplified schematic of an example boost converter 100. A boost converter is a switched-mode power supply (SMPS) that typically includes at least a transistor 103 that acts as a switch (S), a diode 102, and at least one energy storage element, such as inductor (L) 101 and output capacitor 104. In some embodiments, an additional output filter and/or an input filter may also be provided. The input and output filters typically include capacitors, and may also include inductors. Control circuitry 106 controls the switching rate and duration of switch 103 to provide a desired output voltage (Vo) at node 114 using an input voltage (Vi) on input node 110 provided by source 107. Source 107 may be a battery, for example, or may be a direct current (DC) voltage derived from a regulator coupled to an alternating current (AC) supply, for example. A load 105 may be a single device such as a resistor (R), or it may be a more complicated circuit or device. Load 105 may be a fixed load or may vary in power consumption over time.

Typically, switch 103, diode 102, and control circuitry 106 may be implemented on a single integrated circuit (IC) 120 and inductor 101 and capacitor 104 may be implemented as discrete components external to IC 120. However, in some low power applications, inductor 101 and/or capacitor 104 may be implemented within IC 120 using known or later developed fabrication techniques.

The key principle that drives the boost converter is the tendency of inductor 101 to resist changes in inductor current $I_L$ 111 by creating and destroying a magnetic field. In a boost converter, the output voltage Vo is typically higher than the input voltage Vi.

When switch 103 is closed for a first time period, current 111 flows through the inductor 101 and switch 103 in clockwise direction and the inductor stores some energy by generating a magnetic field. Switch current 112 is essentially the same as inductor current 111 during this first time period. In this example, the polarity of the input side of inductor 101 is positive.

When switch 103 is opened for a second time period, switch current 112 drops to essentially zero. The magnetic field previously created by inductor 101 will collapse to maintain the inductor current 111 current towards the load. Thus, the polarity of the inductor will be reversed such that the input side of the inductor will be negative. As a result, input voltage source 107 and inductor 101 will be two voltage sources in series causing a higher voltage to charge capacitor 104 through diode 102. In other words, while the switch is open the only path offered to inductor current 111 is through freewheeling blocking diode D, the capacitor C and the load R. This results in transferring the energy accumulated by the inductor during the switch on-state into the capacitor.

If switch 103 is cycled fast enough, inductor 101 will not discharge fully in between charging stages, and the load will always see a voltage greater than that of the input source alone when the switch is opened. Also while the switch is opened, capacitor 104 in parallel with the load is charged to this combined voltage. While switch 103 is closed, diode 102 is reverse biased and capacitor 104 and load 105 are disconnected from the input source 107. During this time period, capacitor 104 provides an output voltage and energy to the load. During this time, a blocking diode prevents the capacitor from discharging through the switch. The switch must of course be opened again fast enough to prevent the capacitor from discharging too much.

The input current in this example boost converter is the same as the inductor current. Therefore, it is not discontinuous as in the buck converter and the requirements for an input filter are relaxed as compared to a buck converter.

Inductor switch 103 may be implemented as a transistor, such as a power MOSFET (metal oxide semiconductor field effect transistor). There are at least two possible implementations for diode 102. It may be implemented as an actual diode, in which case the converter is referred to as an "asynchronous converter." Alternatively, diode 102 may be implemented as another power MOSFET switch, in which case the converter is referred to as "synchronous converter."

In the first case, an actual diode will start/stop conducting without the need to provide a control signal to the diode itself; therefore the name "asynchronous." In the case of a synchronous implementation, control logic 106 must provide two control signals, one controlling the inductor switch 103 (also called the low side switch) and another control signal controlling the diode switch 102 (also called the high side switch). These signals are basically opposite in levels; when one is ON, other is OFF and vice versa. These control signals may be produced synchronous to a clock signal generated inside the converter, for example.

The main principle of the converter's operation is the same in either case. In state-of-the-art industry implementations, however, synchronous converters now dominate. An example state-of-the-art boost converter is the TPS61089x family of devices available from Texas Instruments Incorporated, as described in publication SLVSD38B, November 2015, which is incorporated by reference herein.

Figure 2:
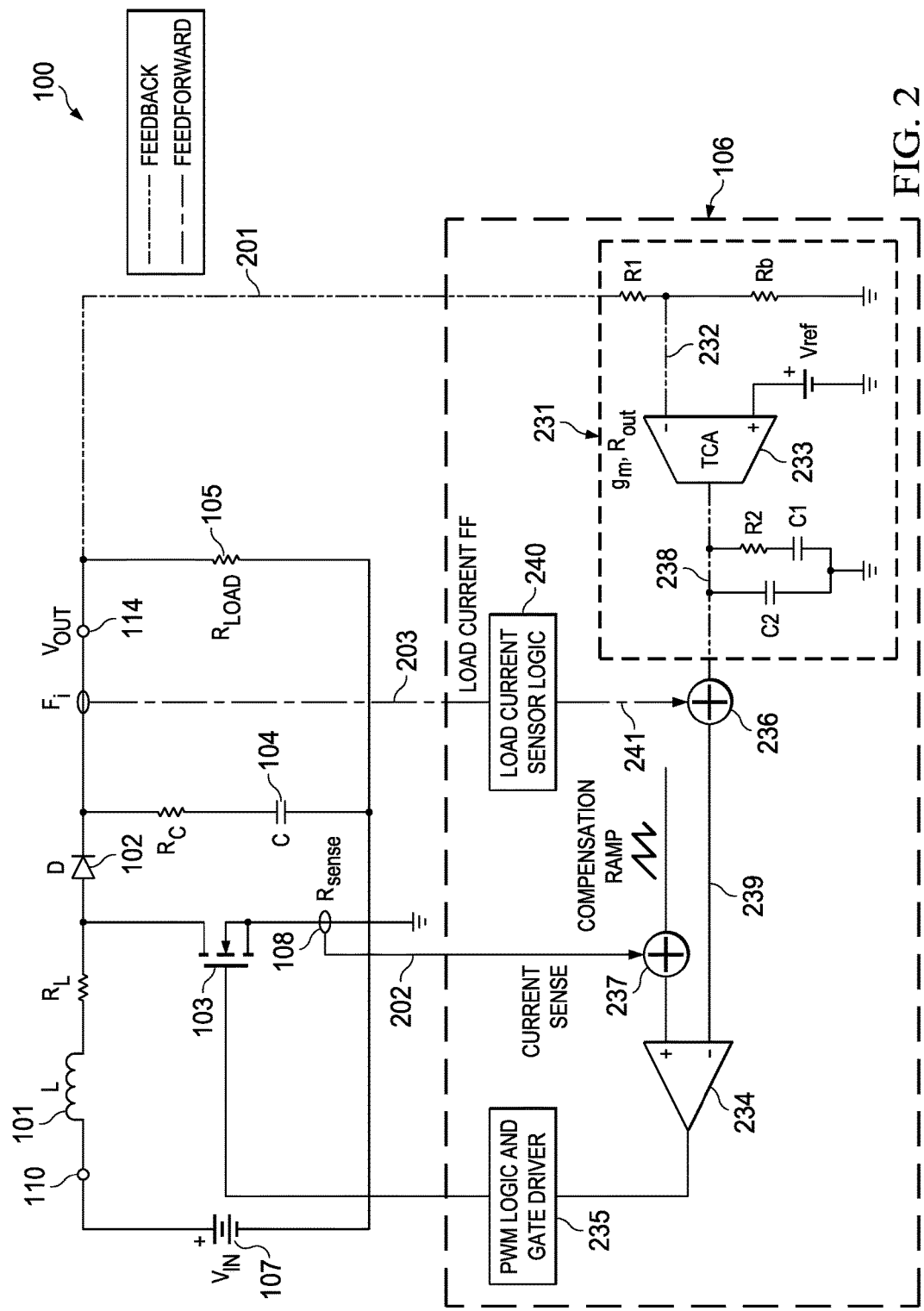
FIG. 2 is a more detailed schematic of the example boost converter of FIG. 1.

FIG. 2 is a more detailed schematic of example boost converter 100. In this schematic, low side switch 103 is illustrated as a MOSFET, while high side switch 102 is illustrated as a diode. However, as described above, high side switch 102 may be implemented as a MOSFET with the addition of an appropriate control signal provided by control logic 106.

In this example, control logic 106 makes use of a peak current mode control scheme that is based on voltage feedback loop 201 and a switch current loop 202 and is augmented by a load current feedforward loop 203. The voltage feedback loop 201 provides a reference signal 239 to current comparator 234 in order to program the value of the inductor current by varying the duty cycle of low side switch 103 under control of PWM logic 235. In some embodiments, the frequency of operation of switch 103 may also be varied. The dynamic response of the system may be limited by the lowest of response time of these two loops. The voltage feedback loop has a RHPZ in its transfer function and therefore must be designed to have a relatively slow dynamic response in terms of frequency response in order to maintain stability.

Output voltage feedback loop 201 includes output voltage feedback circuitry 231 within control logic 106 that provides a feedback control signal based on output voltage Vo that may be sampled at node 114. Feedback circuitry 231 is typical of that used in prior boost converters. Resistors R1, Rb form a voltage divider that produces a scaled voltage 232 that is compared against a reference voltage Vref by a transconductance amplifier 233. A target value for Vo may be determined by the ratio of R1, Rb and the value of Vref. Pulse width modulation (PWM) logic 235 produces a control signal that causes low side switch 103 to turn off and on as discussed above with reference to FIG. 1. Feedback circuitry 231 generates an error signal 238 based on sampling Vo that may then be used by PWM logic 235 to vary the on/off time of low side switch 103 in order to maintain Vo at a desired value.

Switch current loop 202 includes a current sensor R(sense) to detect the amount of current passing through low side switch 103. A simple resistor connected in series with switch 103 may be used to sense the switch current. Adder 237 produces a compensation ramp signal that is compared by comparator 234 to an error signal 239 from feedback loop 201. As will be described in more detail below, error signal 238 from the voltage feedback loop 201 is augmented via adder 236 using a load current feedforward control signal provided load current logic 240 in feedforward loop 203 to form combined error signal 239.

Consider what happens when current drawn by load 105 suddenly increases. In this case, output voltage Vo may drop significantly due to more rapid discharge of capacitor 104. Without the mitigating effect of feedforward loop 203, feedback circuitry 231 will detect this drop and call for more current through inductor 101 which is produced by turning low side switch 103 on for a longer period of time. However, this has the effect of leaving capacitor 104 isolated for a longer period of time which causes the output voltage Vo to drop by a significant amount. Over time operation balances back out at the higher load current, but for a period of time the output voltage level is compromised. This undershoot operation is the result of the RHPZ that is in the transfer function for a boost converter, as described above. A similar transient overshoot occurs when the load current is suddenly reduced.

Output current feedforward loop 203 provides a mechanism to provide a faster response when the output current changes. In order to improve the response time of converter 100, feedforward loop 203 requires a way to measure load current and requires a proper transfer function that will augment the operation of the voltage feedback loop 201. Existing control theory suggests an optimal value of the feedforward information ($F_{i-opt}$) for a boost converter, as illustrated in expression (1). See, for example, Richard Redl and Nathan O Sokal, "Near-Optimum Dynamic Regulation Of Dc-Dc Converters Using Feed-Forward of Output Current And Input Voltage with Current-Mode Control," 1986, which is incorporated by reference herein. Expression (1) is a Laplace transfer function that relates the input of this sub-system (the sensed load current information) with the output (the load current information gained and filtered in frequency to provide the optimal feedforward behavior) that may be derived from the state-space averaged model. S is a Laplace transform variable.

$$F_{i-opt}(s) \cong \frac{R_{sense}}{(1-D) \cdot \left(1 - \frac{s}{\omega_{RHPZ}}\right) \cdot \left(1 + \frac{s}{\omega_{LHPZ}}\right)} \quad (1)$$

where: $R_{sense}$ is the equivalent internal switch current sense resistor 108 used in CMC (current mode control) Sense resistor 108 may be the "on resistance" of low side switch 103, for example; and D is the duty cycle of low side switch 103.

However, expression (1) cannot be implemented directly since RHP poles are not physically realizable due to their unconstrained pulse response. A slightly suboptimal expression may be derived from (1), as represented by (2) that only relates to the gain of the transfer function. Expression (2) is easily realizable since it only depends on the duty cycle D and the value of the switch current sense resistor $R_{sense}$ 108. However, using only the DC term provides load information in the steady state after the transient; there is no additional control information during the transient itself.

$$F_{i_{opt\_DC}} = \frac{R_{sense}}{1-D} \quad (2)$$

Thus, expression (2) provides a good gain coefficient that may be used to optimize the output of feedforward loop circuitry 240. The level of load current feedforward information may be adapted to an optimal level using an automatic gain control loop and a variable gain amplifier (VGA), as will be explained in more detail below. The load current feedforward information may be combined with classical peak current mode control in some embodiments.

Although expression (2) is conceptually easy to implement, using an actual resistor to measure load current at a point beyond output capacitor 104 and its associated parasitic resistance $R_C$, such as at node 114, is undesirable. This is because adding any impedance between output capacitor 104 and the load 105 will cause an undesirable voltage drop. Furthermore, since the output capacitor may be implemented outside of the IC containing control logic 106, an additional pin or two would be required for the sense signal.

Load current sensing may be performed without adding impedance to the output port by differentiating the converter's output voltage, such as at node 114. There are two components of output current. While low side switch 103 is open, inductor 101 may be providing to current to load 105 as well as to charging capacitor 104. While low side switch 103 is closed, high side switch 102 blocks any current from inductor 101 so that the load current is provided only by output capacitor 104. Thus, during the time period in which low side switch 103 is closed, output voltage at node 114 may be represented by expression (3).

$$-\frac{dv_{out}(t)}{dt} \cong \frac{i_{load}(t)}{C} \quad (3)$$

Figure 3:
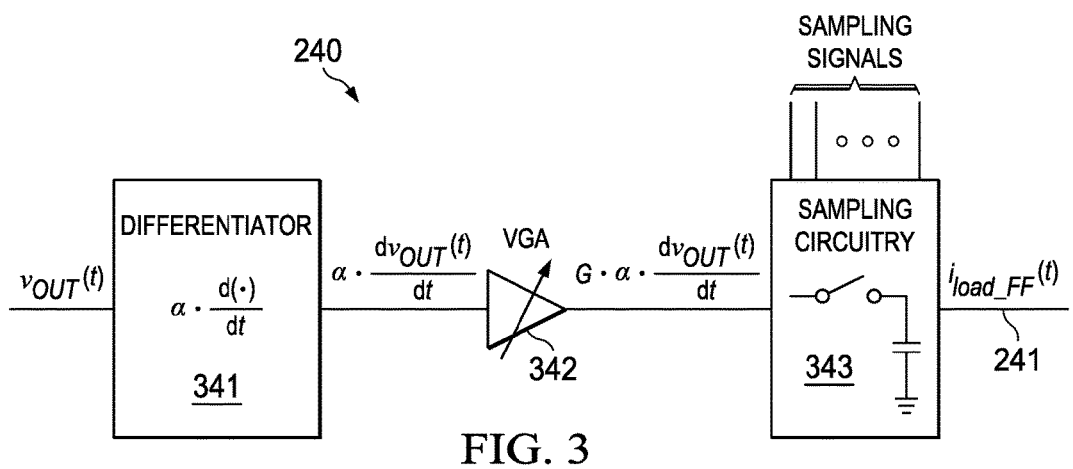
FIG. 3 is a block diagram illustrating circuitry for sensing output current by differentiating the output voltage of the example boost converter of FIG. 2.

FIG. 3 is a block diagram illustrating circuitry for sensing output current by differentiating the output voltage at node 114 of the example boost converter 100 of FIG. 2 to form the output feedforward loop 203 shown is FIG. 2. Differentiator 341 may be implemented using known or later developed circuits, such as a two input op-amp with one input coupled to node 114 via a capacitor and the other input connected to ground, for example. In another embodiment, a switched capacitor based differentiator may be used, for example. The op-amp may be configured to have a fixed gain "a," for example. Variable gain amplifier (VGA) 342 allows the output signal from differentiator 341 to be amplified by a variable gain "G" which may be dynamically controlled, as will be explained in more detail below. Sampling circuitry 343 may be configured to sample the output of amplifier 342 at specific times to form a control signal 241 that is representative of the instantaneous load current ($i_{load\_FF}(t)$) at any instant in time. Control signal 241 is the output of current feedforward loop 203 as shown in FIG. 2 and may be combined using adder 236 with the output voltage feedback error signal 238 produced by feedback loop 201.

Figure 4A:
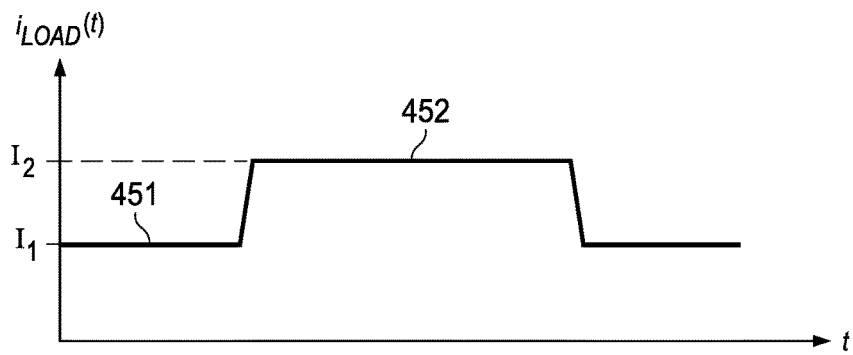
FIGS. 4A-4D are example timing diagrams illustrating operation of the circuitry of FIG. 3.

FIGS. 4A-4D are example timing diagrams illustrating operation of the circuitry of FIG. 3. In the example of FIG. 4A, the load provided by load resistor 105 in FIG. 2 is initially drawing a current having a magnitude of $I_1$ as indicated at 451. Load 105 then changes to draw a current having a magnitude of $I_2$ as indicated at 452.

Figure 4B:
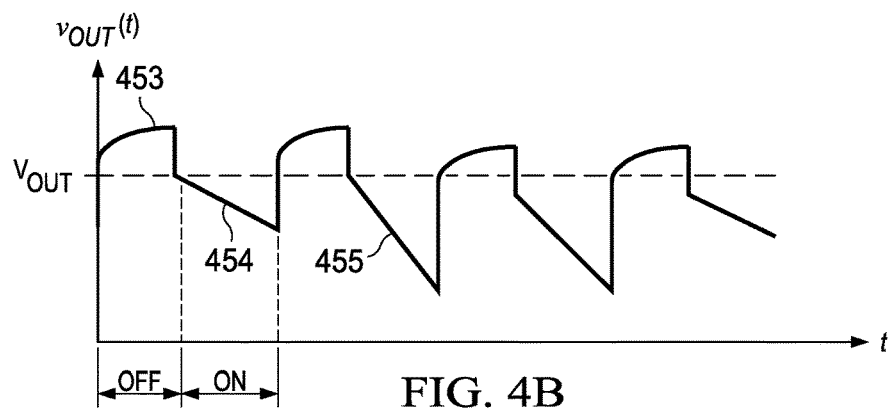

FIG. 4B illustrates a corresponding output voltage as measured at node 114 in FIG. 2. During a first time period, the low side switch 103 is in the off state and inductor 101 is providing a voltage that charges capacitor 104 as shown in FIG. 2 and thereby increases output voltage $V_{out}$ measured at node 114, as illustrated at 453. During a second time period, low side switch 103 is in the on state and current from inductor 101 is blocked from capacitor 104. $V_{OUT}$ therefore begins to drop as capacitor 104 is discharged by load 105, as indicated at 454. This general process repeats over time with the ratio of on state and off state being adjusted by PWM logic 235 as shown in FIG. 2. In this example, when the load current increases from $I_1$ to $I_2$, the discharge rate of capacitor 104 increases, as indicated at 455. As discussed above, the actual load current can therefore be inferred by differentiating the output voltage to determine the discharge rate of output capacitor 104.

Figure 4C:
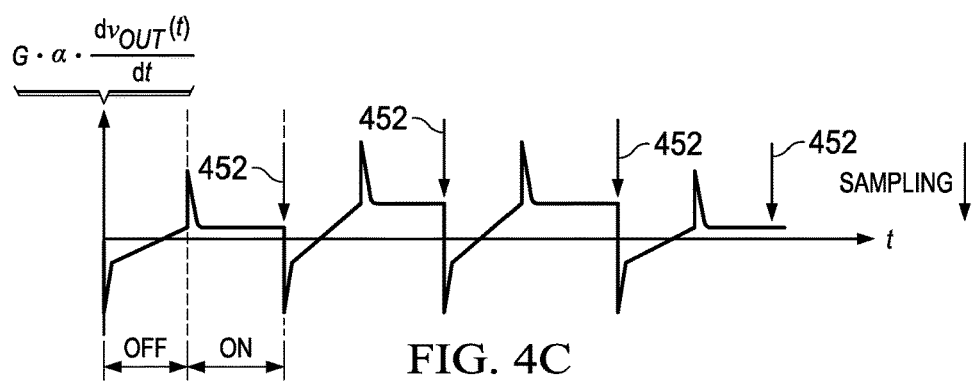

FIG. 4C is a an example plot illustrating the output signal from VGA 342, which represents the differentiated version of the output voltage and has a magnitude indicated by expression (4).

$$VGA_{out} = G(V_{ctrl}) \cdot \alpha \cdot \frac{dv_{out(t)}}{dt} \quad (4)$$

As discussed above, a signal indicative to the load current may be produced by sampling this differentiated signal during the on-time period of low side switch 103. Typically, voltage spikes may occur around the switch time for low side switch 103 due to circuit parasitics, as illustrated. Therefore, a sequence of sampling points 452 may be positioned just before the turn off-time switching point of low side switch 103 which is in a relatively calm region of the voltage waveform to increase the sampling accuracy.

Figure 4D:
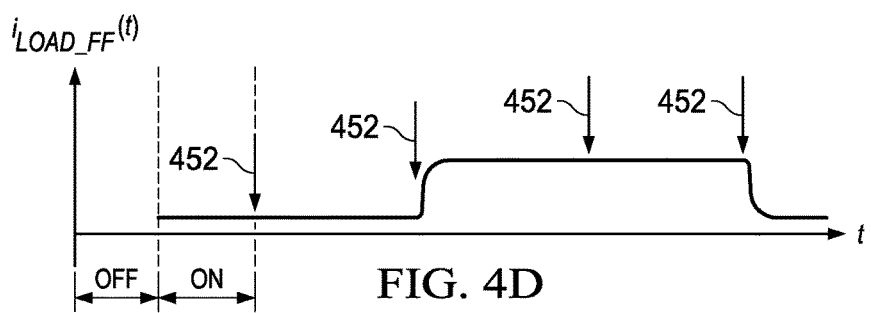

FIG. 4D illustrates an example of the resulting load current feedforward control signal ($I_{LOAD\_FF}(t)$) 241 that is then output from sampling circuit 343. As can be seen by comparing FIG. 4A to FIG. 4D, this signal provides a good representation of the actual load current through load resistor 105.

As mentioned above, the gain "G" of VGA 342 may be varied dynamically to adjust the magnitude of the load current feedforward signal 241 to more closely match an optimum feed forward value indicated by expression (2). In order to do this, the variables that are available include the inductor switch current as indicated by voltage measured across switch current sense resistor $R_{sense}$ 108 ($R_{sense}$ times the switch current), the input voltage at node 110, the output voltage at node 114, and the duty cycle D. For a given converter configuration, the input voltage, output voltage and duty cycle are all fixed, so the switch current is the only variable that may be used for feedback actuation.

The switching period of low side switch 103 of converter 100 may be selected based on the value of inductor 101, the input voltage, and the desired output voltage. In the example embodiment described herein, a switching frequency in the range of 500 kHz to 2 MHz works well for a converter that may handle 10 A full load at 3.3 V input voltage using a 2.2 µH inductor, for example. Sampling points 452 ideally occur during a calm region of the differentiated output voltage signal. Operating at 500 kHz produces an adequate quiet region. As switching rate increases, the calm region becomes smaller and it becomes more difficult to sample accurately due transients caused by parasitic in the circuit.

Figure 5:
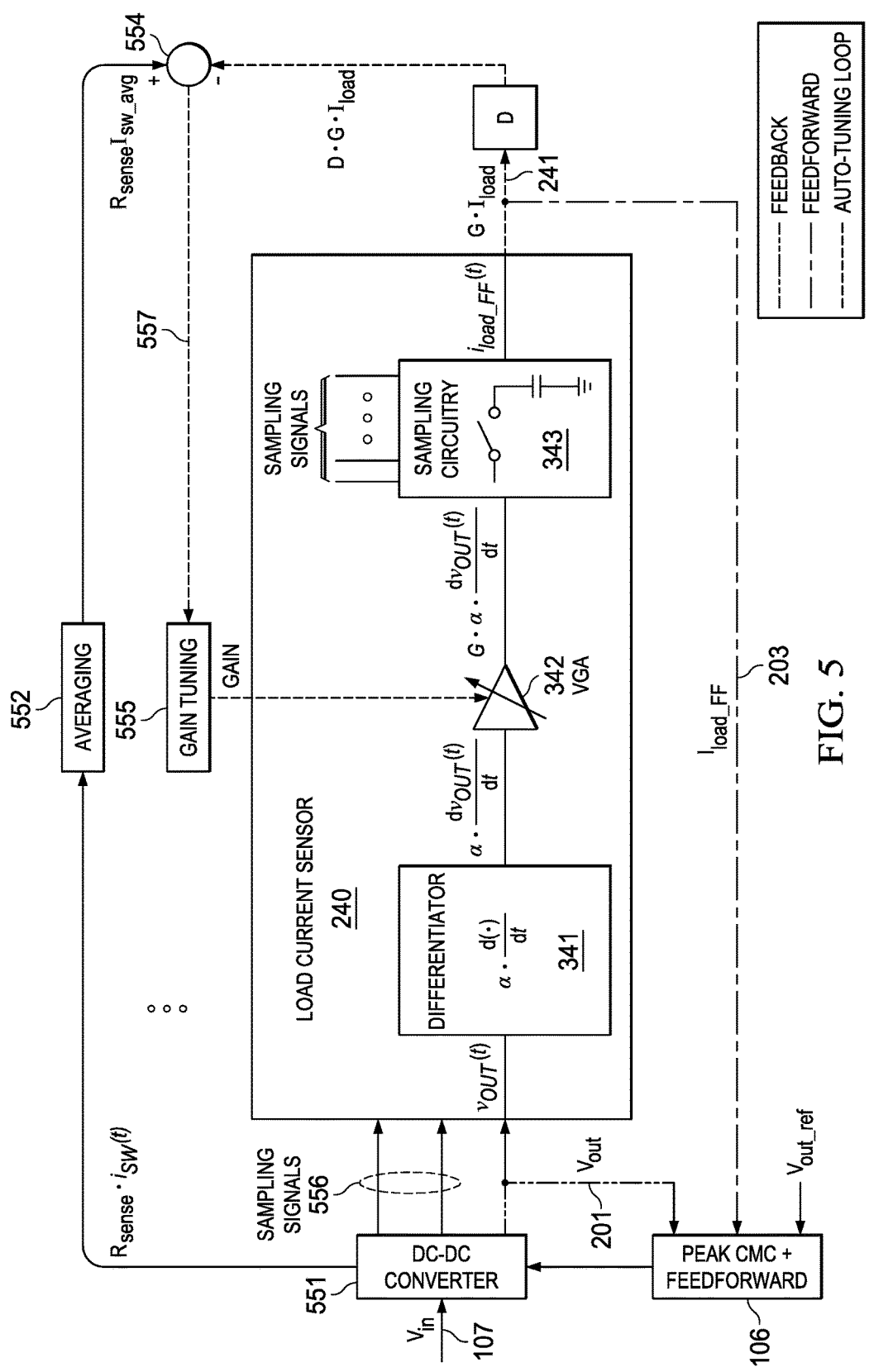
FIG. 5 is a functional block diagram illustrating operation of the boost converter of FIG. 2.

FIG. 5 is a functional block diagram illustrating operation of the boost converter of FIG. 2. In this example, converter block 551 includes inductor 101, upper switch 102, lower switch 103, output capacitor 104, load 105, and switch current sense resistor 108, as shown in more detail in FIG. 2. Output feedback loop 201 and control logic 106 are the same as described in FIG. 2. Load current sensor logic 240, as described in more detail with regard to FIG. 3, uses sampling signals 556 to produce the sequence of samples 452 as shown in FIG. 4C. The operation of load current feedforward loop 203 will now be described in more detail.

In this example, averaging circuit 552 averages the voltage measured across switch current sense resistor 108 to form a signal that represents the average switch current through sense resistor 108.

In order to produce an optimized load current feedforward control signal, the load current signal needs to be adjusted for different duty cycles and output capacitor values to match the optimal value described in expression (1) and (2), as illustrated by expression (5).

$$I_{load\_FF} = F_{i\_opt\_DC} \cdot I_{load\_avg} \quad (5)$$

Substituting with expression (2) yields expression (6). It can be assumed that average load current divided by 1-D is approximately the same as average inductor current, therefore average load current divided by (1-D) may be replaced with average inductor current ($I_{L\_avg}$) to yield expression (7).

$$I_{load\_FF} = R_{sense} \cdot \frac{I_{load\_avg}}{1-D} \quad (6)$$

$$I_{load\_FF} = R_{sense} \cdot I_{L\_avg} \quad (7)$$

Now, a reference that can be tracked may be derived from the average switch current ($I_{SW\_a}$) signal provided by averaging function 552 as shown in expression (8).

$$I_{SW\_avg} = D \cdot I_{L\_avg} \quad (8)$$

Multiplying (8) by $R_{sense}$ yields expression (9).

$$R_{sense} \cdot I_{SW\_avg} = R_{sense} \cdot D \cdot I_{L\_avg} \quad (9)$$

Scaling expression (7) by "D" yields expression (9).

$$I_{load\_FF} \cdot D = (R_{sense} \cdot I_{L\_avg}) \cdot D \quad (10)$$

Combining (9) and (10) yields expression (11).

$$I_{load\_FF} \cdot D = R_{sense} \cdot I_{SW\_avg} \quad (11)$$

Referring again to FIG. 5, multiplier 553 produces the left side of expression (11) based on the value of D that is set when the converter is configured. The multiplication factor D is the duty cycle of converter and therefore 0<D<1 (theoretically, in practice this boundary is even narrower). Multiplication of a signal by D can be done simply by using a PWM modulation principle. For example, if the signal on the input of block 553 has an amplitude of A, then passing this signal D % of time and the rest (1-D) % of time passing 0, results in a square-like waveform with the average value of D*A. Therefore, the multiplier may be implemented as a multiplexer (MUX) which passes the load current information D percent of the time and zero current the rest (1-D) of time. This MUX may be controlled by the same control signal that is used for controlling the power switches in the converter. The resulting waveform may be averaged in a similar manner used for averaging the switch current, for example, to produce the multiplication by D. Averaging the output of the MUX slows down the response time of this signal, but this is acceptable since this signal is part of the gain tuning loop and is intended to have a slow response time.

Averaging logic 552 produces the right half of expression (11). An error amplifier is used to implement the functions of error estimation 554 and amplification with proper bandwidth 555 to dynamically set the value of gain G so the expression (11) is satisfied. In this manner, an auto-tuning loop is formed that dynamically controls the gain of VGA 342. Error signal 557 will be minimum when the load current feedforward loop is optimized. The load current feedforward loop is optimized when the gain value G is equal to an optimal gain value for the feedforward loop.

During steady state operation of converter 100, the value D of the duty cycle of low side switch 103 remains at a constant value that may be set when the converter is initially configured in order to specify a particular ratio between the input voltage and the output voltage. In some embodiments, the value of D may be programmable to allow different output voltages to be produced at different times. During transient operation, the value of D may vary for short periods of time in order to more quickly damp out the transients. During transient operation, the switching period may also vary for short periods of time in order to more quickly damp out the transients.

Gain tuning loop 555 is designed to have slow response time. It only needs to vary in response to the duty cycle value D, Vin, and Vout, the value of the output capacitor 104, operating temperature of converter 100, etc.

Figure 6A:
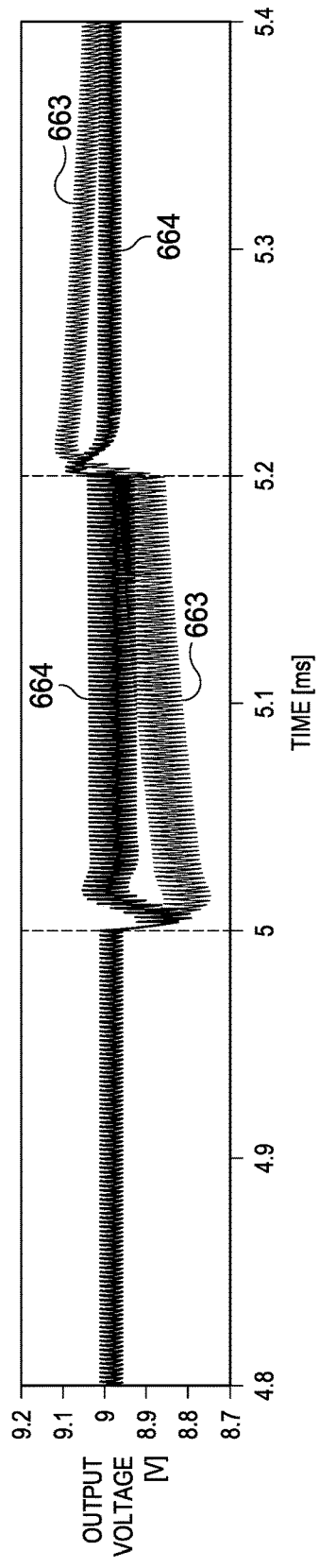
FIG. 6A-6D are timing diagrams illustrating operation of the boost converter of FIG. 2.
Figure 6B:
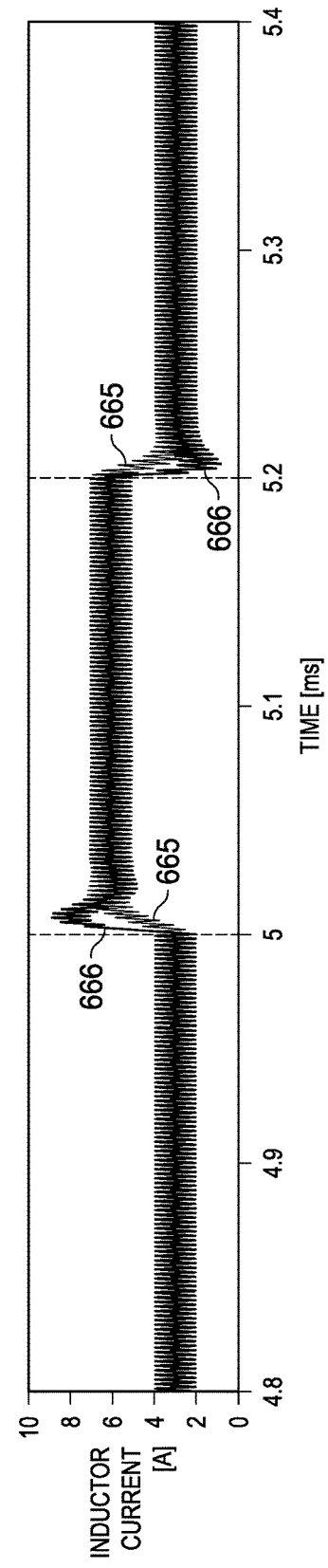
Figure 6C:
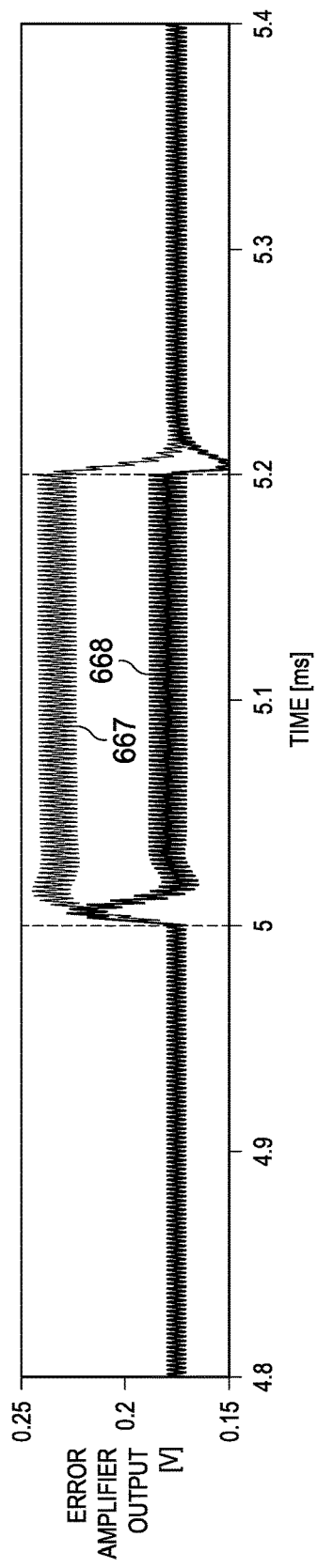
Figure 6D:
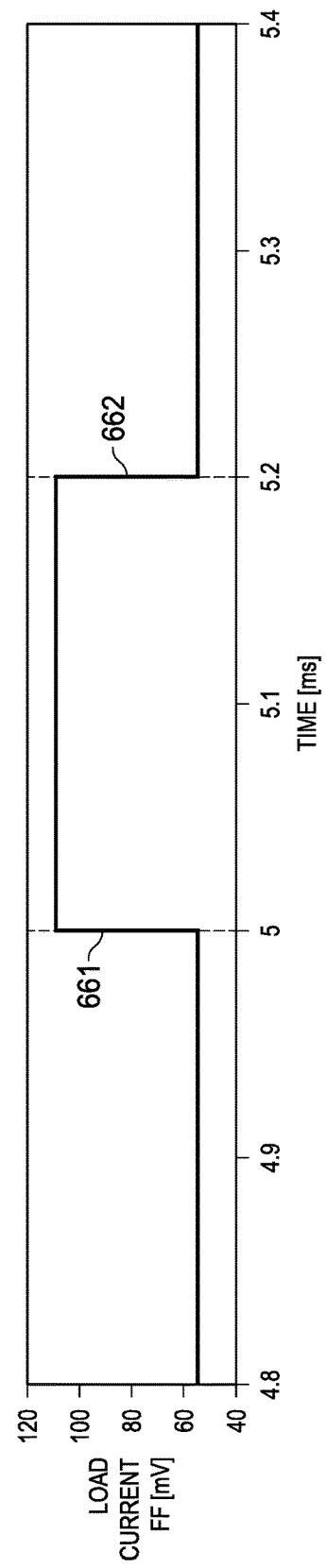

FIG. 6A-6D are timing diagrams illustrating operation of the boost converter of FIG. 2. FIG. 6D illustrates load current feedforward control signal 241 in mV vs. time in msec for a period of time that includes transients caused by an increase in load current at time point 661 and a decrease in load current at time point 662. In some embodiments, the gain value G may be set when the converter is turned on. In other embodiments, gain loop 555 may operate periodically and sample each current state of converter 100 over time. In the embodiment illustrated herein, gain loop 555 is designed to operate continuously, but at a very low rate.

FIG. 6A illustrates output voltage vs. time in ms for a period of time that includes transients that may occur due to the change in load current at time points 661, 662. Plot line 663 represents a response from a typical prior converter that uses classic CMC with output voltage feedback, while plot line 664 illustrates the improved response of the embodiment disclosed herein that uses an output current feedforward loop to augment the classic CMC and output voltage feedback loop technique. Notice how much quicker plot line 664 settles to the nominal regulated output voltage value than plot line 663 even if the two solutions have the same feedback compensation applied to the voltage error amplifier.

FIG. 6B illustrates inductor current in Amps vs. time in msec. Plot line 665 represents a prior converter that uses classic CMC with output voltage feedback, while plot line 666 illustrates the improved response of the embodiment disclosed herein that uses an output current feedforward loop. Notice how the inductor current responds in a slight overshoot manner in response to the load current feedforward loop in order to more quickly stabilize the output voltage. The inductor current may be adjusted by changing the duty cycle of low side switch 103. In some embodiments, the switching period of low side switch may also be adjusted to control inductor current.

FIG. 6C illustrates the output of voltage feedback error amplifier 233, referring to FIG. 2, in volts vs. time in msec. Plot line 667 represents a prior converter that uses classic CMC with output voltage feedback, while plot line 668 illustrates the improved response of the embodiment disclosed herein that uses an output current feedforward loop. Notice that in the prior converter the error level 667 stays almost constant during the load current transient while in the present embodiment error signal 668 quickly returns to a quiescent value. This is because in the prior converter, the voltage feedback loop must compensate for offsets in load current, while in the embodiment disclosed herein the load current feedforward loops provides compensation for load current offsets while leaving to the voltage error amplifier only the adjustment of the steady-state error.

As discussed above, the switching period may be adjusted for a short period of time in order to change the inductor current. The basic inductor equation is shown by expression (12)

$$V = L\frac{di}{dt} \tag{12}$$

Assume for example that converter 100 needs to transition from a load current of approximately zero A to 10 A. Assume that the input voltage 107, referring to FIG. 1, is 3.3 V and inductor 101 has a value of 2.2 µH, it will take approximately 6.7 µsecs to reach a current value of 10 A. Assume for example that the switching rate is nominally 1 MHz with a switching period of 1 µsec. Therefore, during a transient period to allow the load current to transition from zero amps to ten amps PWM logic 235, as shown in FIG. 2, may be configured to adjust the switching period to allow an on-time for low side switch 103 of nearly seven microseconds, for example, in response to load current feedforward loop 203.

VGA 342 and gain tuning loop 555 allows variations in converter 100 to be easily handled. For example, the value of output capacitor 104, inductor 101, input voltage 107 and output voltage 114, referring again to FIG. 1, are typically chosen by a designer that is incorporating an IC 120 into another system based on the requirements of that system.

Similarly, variations in the operation of converter 100 over time may also be accommodated by VGA 342 and gain control loop 555. For example, changes in operating temperature may change the on-state impedance of low side switch 103 which may require small changes in duty cycle D to maintain a desired output voltage.

Figure 7:
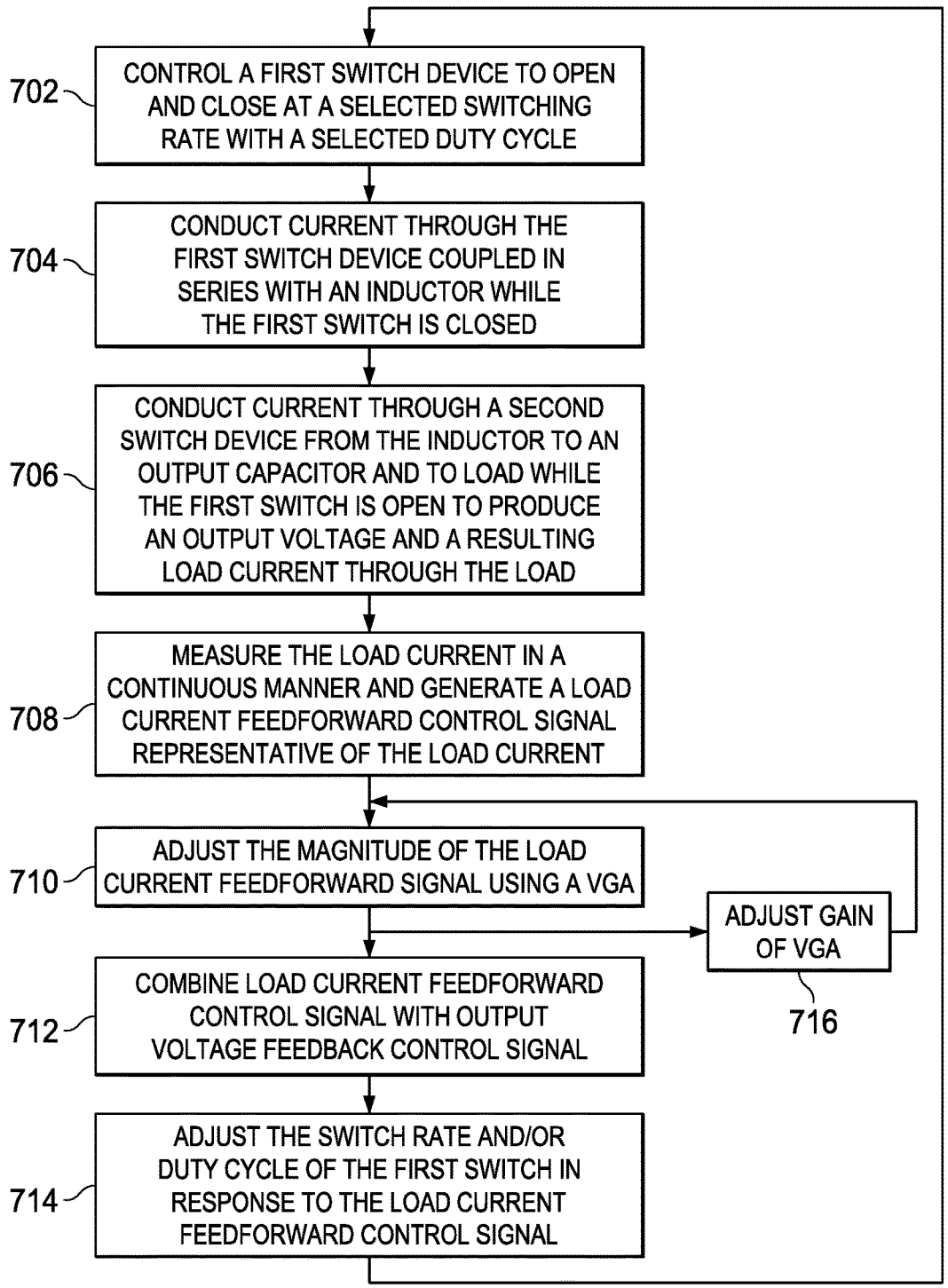
FIG. 7 is a flow diagram illustrating operation of the boost converter of FIG. 2.

FIG. 7 is a flow diagram illustrating operation of the boost converter 100 of FIG. 2. As described above in more detail, in an embodiment of the present disclosure the constraints of a RHPZ in a switched converter such as a flyback, boost, Ćuk, etc, may be mitigated by sensing the load current of the converter and using the result as a feedforward control signal.

As described above in more detail, a low side switch such as switch 103 in FIG. 2 may be controlled to open and close at a selected switching rate with a selected duty cycle (D) as indicated at 702. Current may be conducted through the low side switch device coupled in series with an inductor while the low side switch is closed as indicated at 704. This current may be conducted to a ground plane is some embodiments. In other embodiments, a different voltage supply configuration may be used, such as a negative supply voltage, etc.

When the low side switch is opened, current may be conducted from the inductor through a high side switch device, such as switch 102 as shown in FIG. 2, due to the conservation of current principle of an inductor as indicated at 706. This current may be provided to charge an output capacitor and from there to a load device coupled to the output of the converter. In this manner, a boosted output voltage may be produced on the output capacitor that is larger than the input voltage.

The load current may be measured in a continuous manner in order to generate a load current feedforward control signal representative of the load current as indicated at 708. Differentiation of the boost converter's output voltage provides a simple lossless method for estimating the load current of boost converter, as described in more detail above.

The level of this feedforward control signal may be adjusted by adaptation circuitry as indicated at 710 to an optimal level using an automatic gain control loop and a variable gain amplifier (VGA), such as VGA 342 and gain tuning logic 555 shown in FIG. 5.

The use of adaptation circuitry to set the level of the feedforward signal makes this solution flexible to variations of a converter's circuit elements, such as output capacitance, or to variation in voltage conversion ratio, etc. This provides flexibility to adjust the level of the estimated load current to an optimal theoretical value independently of the load current sensor that is used.

In some embodiments, this feedforward control signal may be combined with a classical peak current mode control architecture that includes an output voltage feedback loop, as indicated at 712.

In some embodiments, the gain for the VGA may be set periodically as indicated at 716 by a feedback loop in which a first signal proportional to an instantaneous average switch current of a current flowing through the first switch device is generated. This may be done using logic such as averaging circuit 552 in FIG. 5. A second signal proportional to the load current feedforward control signal is generated. As explained with regard to expression (11), duty cycle D may be used to scale the load current feedforward control signal for this comparison using logic such as multiplier 553 in FIG. 5. A gain value may be selected for the VGA to minimize a difference between the first signal and the second signal.

As described above in more detail, the gain value of the VGA may be updated at a slow rate to accommodate changes in operating parameters due to temperature, age, etc.

The switch rate and/or duty cycle of the low side switch may be adjusted in response to the load current feedforward control signal, as indicated at 714. This process repeats for each switching cycle of the low side switch.

Thus, a boost converter or other type of switched or pulsed voltage converter may be embodied as described herein to have improved dynamic performance during load transients as compared to current state-of-the-art converters. The techniques disclosed herein are flexible in terms of the boost converter circuit's parameters, such as output capacitance value, inductor values, voltage conversion ratios, etc. The use of auto-tuning circuitry alleviates the necessity to know the converter's internal parameters, such as duty cycle, output capacitance, etc.

The techniques disclosed herein may be combined with existing current mode control systems and output voltage feedback systems.

Other Embodiments

While the disclosure has been described with reference to illustrative embodiments, this description is not intended to be construed in a limiting sense. Various other embodiments of the disclosure will be apparent to persons skilled in the art upon reference to this description. For example, while a boost converter was described herein, other embodiments may include various types of discontinuous, pulsated, switched, etc. output voltage converters. For example, inverting buck-boost, non-inverting buck-boost, flyback, Ćuk, etc. converters may be implemented using the techniques disclosed herein.

While determination of load current using differentiation of the output voltage was described herein, other embodiments may use different schemes for determining load current. For example, a voltage drop may be measured across a simple resistor or other impedance device. A magnetic Hall device may be used to measure load current. A time constant comparator may be used to compare the rate of decay of the voltage on the output capacitor the rate of decay of the voltage on a known capacitor. Other known or later developed techniques for measuring current may be used in various embodiments.

An IC containing an embodiment of the switches and control circuitry disclosed herein may be provided as a standalone IC device. In another embodiment, the switches and control circuitry may be included with other logic and circuitry within a system on a chip (SoC), for example.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A switched voltage converter comprising:
   an inductor having first and second terminals, the first terminal coupled to an input node, and the second terminal coupled to a switch node;
   a first switch having a control terminal, a first input terminal and a first output terminal, the first input terminal coupled to the switch node;
   a second switch having a second input terminal and a second output terminal, the second input terminal coupled to the switch node, and the second output terminal coupled to an output node;
   control circuitry having a control input and a control output, the control output coupled to the control terminal, and the control circuitry configured to provide a switching signal at the control output responsive to an error signal;
   load current sensor logic having a logic input and a logic output, the logic input coupled to the output node, the load current sensor logic configured to provide a load current feedforward control signal at the logic output responsive to a load at the output node, in which the load current sensor logic includes: a variable gain amplifier (VGA) having a VGA input and a VGA output, the VGA output coupled to the logic output, and the VGA configured to modify an amplitude of the load current feedforward control signal at the logic output responsive to a gain control signal; and
   a gain tuning feedback path including: a comparator having a first comparator input, a second comparator input and a comparator output, the comparator output coupled to the control input, and the comparator configured to provide the error signal at the comparator output responsive to the first and second comparator inputs; an average switch current sensor having a sensor input and a sensor output, the sensor input coupled to the first output terminal, and the sensor output coupled to the first comparator input; a scaling circuit having a scaling input and a scaling output, the scaling input coupled to the logic output, the scaling output coupled to the second comparator input, and the scaling circuit configured to scale the load current feedforward control signal by a duty cycle value and to provide the scaled load current feedforward control signal at the scaling output; and gain logic having a gain input and a gain output, the gain input coupled to the comparator output, the gain output coupled to the VGA input, and the gain logic configured to provide the gain control signal at the gain output responsive to the error signal.

2. The switched voltage converter of claim 1, wherein the load current sensor logic includes a differentiator circuit configured to differentiate a voltage at the output node.

3. The switched voltage converter of claim 1, further comprising an output voltage feedback circuit coupled between the output node and the control circuitry.

4. The switched voltage converter of claim 1, wherein the second switch is a diode.

5. The switched voltage converter of claim 1, wherein the switched voltage converter is a boost converter.

6. A method for operating a switched voltage converter, the method comprising:
   controlling a first switch device to open and close at a selected switching rate with a selected duty cycle;
   conducting current through the first switch device coupled in series with an inductor while the first switch device is closed;
   conducting current through a second switch device from the inductor to an output capacitor and to a load while the first switch device is open to produce an output voltage and a resulting load current through the load;
   measuring the load current in a continuous manner and generating a load current feedforward control signal representative of the load current;
   adjusting a magnitude of the load current feedforward control signal using a variable gain amplifier (VGA) controlled by an automatic gain control loop;
   generating a first signal proportional to an instantaneous average switch current of a current flowing through the first switch device;
   generating a second signal proportional to the load current feedforward control signal scaled by the selected duty cycle;
   adjusting a gain of the VGA to minimize a difference between the first signal and the second signal; and
   adjusting the selected switching rate or the selected duty cycle of the first switch device in response to the load current feedforward control signal.

7. The method of claim 6, further comprising determining the instantaneous average switch current of the current flowing through the first switch device;
   wherein adjusting the selected switching rate or the selected duty cycle is performed to minimize a proportional difference between the load current and the instantaneous average switch current.

8. The method of claim 6, wherein measuring the load current in a continuous manner is performed by differentiating the output voltage to form a differentiated output voltage signal.

9. The method of claim 8, further comprising sampling the differentiated output voltage signal at a point in time during each switching cycle of the first switch device while the first switch device is closed to form a signal representative of the load current.

10. The method of claim 6, further comprising: generating an output voltage feedback control signal by comparing the output voltage to a reference voltage; and
   adjusting the selected switching rate or the selected duty cycle of the first switch device in response to the output voltage feedback control signal.

11. A method for operating a switched voltage converter, the method comprising:
   controlling a first switch device to open and close at a selected switching rate with a selected duty cycle;
   conducting current through the first switch device coupled in series with an inductor while the first switch device is closed;
   conducting current through a second switch device from the inductor to an output capacitor and to a load while the first switch device is open to produce an output voltage and a resulting load current through the load;
   generating a load current feedforward control signal representative of the load current by differentiating the output voltage;
   producing a switch current control signal representative of current flowing through the first switch device; and adjusting the selected switching rate or the selected duty cycle of the first switch device to minimize a proportional difference between the load current feedforward control signal scaled by the selected duty cycle and the switch current control signal.

12. The method of claim 11, further comprising adjusting a magnitude of the load current feedforward control signal using a variable gain amplifier (VGA) controlled by an automatic gain control loop.

13. The method of claim 12, further comprising:
generating a first signal proportional to an instantaneous average switch current of a current flowing through the first switch device;
generating a second signal proportional to the load current feedforward control signal; and
adjusting a gain of the VGA to minimize a difference between the first signal and the second signal.

14. The method of claim 11, wherein generating the load current feedforward control signal further includes sampling the differentiated output voltage at a point in time during each switching cycle of the first switch device while the first switch device is closed to form a signal representative of the load current.

\* \* \* \* \*